US 6,549,683 B1

(12) United States Patent
Bergeron et al.

(10) Patent No.: US 6,549,683 B1
(45) Date of Patent: Apr. 15, 2003

(54) METHOD AND APPARATUS FOR EVALUATING A SCALE FACTOR AND A ROTATION ANGLE IN IMAGE PROCESSING

(75) Inventors: Alain Bergeron, Sainte-Foy (CA); Michel Doucet, Vanier (CA); Donald Prevost, Cap-Rouge (CA)

(73) Assignee: Institut National D'Optique, Quebec (CA)

(*) Notice: Subject to any disclaimer, the term of this patent is extended or adjusted under 35 U.S.C. 154(b) by 0 days.

(21) Appl. No.: 09/563,635

(22) Filed: May 2, 2000

(51) Int. Cl.$^7$ .................................................. G06K 9/32
(52) U.S. Cl. ........................ 382/298; 382/209; 382/278; 382/280; 382/296
(58) Field of Search ................................ 382/209, 210, 382/217, 218, 280, 278, 296, 297, 298; 708/403

(56) References Cited

U.S. PATENT DOCUMENTS

| 4,267,573 A | * | 5/1981 | Chaikin et al. | ............ | 382/296 |
| 5,067,019 A | | 11/1991 | Juday et al. | ............ | 358/160 |
| 6,076,004 A | * | 6/2000 | Kanayama et al. | ......... | 382/296 |
| 6,266,452 B1 | * | 7/2001 | McGuire | .................... | 382/298 |

OTHER PUBLICATIONS

Y.N. Hsu and H. H. Arsenault, "Pattern Discrimination by Multiple Circular Harmonic Components", Appl. Opt. 23, 841, (1984).
Y. Sheng, C. Lejeune, H. H. Arsenault, "Frequency–Domain–Fourier–Mellin descriptors for invariant pattern recognition", Optical Engineering, 27, 5, 354 (1988).
Q. Zhan, T. Minemoto, "Moment invariants for pattern recognition under translation, rotation, and changes of size and brightness", Journal of Modern optics, 40, 11, 2267, 1993.
D. Casasent, S–F Xia, A. J. Lee, J.–Z Song, "Real–time deformation invariant optical pattern recognition using coordinate transformations", Applied Optics, 26, 938, 1987.

* cited by examiner

*Primary Examiner*—Phuoc Tran
(74) *Attorney, Agent, or Firm*—Merchant & Gould P.C.

(57) ABSTRACT

The present invention concerns a method for evaluating a scale factor and a rotation angle in image processing and more particularly digital image processing. The method includes the steps of first providing an input image, and then reducing the input image to provide a smaller image. The smaller image is scaled according to a plurality of factors to produce a plurality of scaled images and is also rotated according to a plurality of factors to produce a plurality of rotated images. The scaled images in the rotated images are then placed into a mosaic which is arranged by scale and rotation. A referenced template is provided and the referenced template is correlated with the mosaic of scaled and rotated images to provide a scale factor and a rotation angle based on the position in the mosaic of the high score relation value between the reference template and the scaled and rotated images. The method is more efficient in that it reduces the amount of computations required to obtain useful results. The method also does not require object centering prior to performing the analysis and does not require complex mathematical expansion of the object under analysis.

19 Claims, 5 Drawing Sheets

METHOD AND APPARATUS FOR EVALUATING A SCALE FACTOR AND A ROTATION ANGLE IN IMAGE PROCESSING

FIELD OF THE INVENTION

The present invention relates to a method and apparatus for evaluating a scale factor and a rotation angle in image processing.

DESCRIPTION OF THE PRIOR ART

In many optically automated applications, there is a need for the evaluation of the rotation angle or scale of an object. For example, if an electronic chip has to be soldered on a printed circuit board, the exact orientation of the object has to be known to ensure a good fit between the pins of the chip and the connectors of the printed-circuit board.

In other applications, it is required to evaluate the distance of an object from a camera, such as for a robot to go pick up an object or, within a pattern recognition system, to compare the object with reference templates at the correct scale factor. The distance between the object and the camera is directly proportional to the scale of the object observed by the camera. Knowing the scale of an object compared to a reference is equivalent to knowing the distance. In both cases this information is useful for further processing, such as in the case of pattern recognition, target tracking and other applications.

A fair amount of research has been done in this field. Among others, U.S. Pat. No. 5,067,019 to Juday et al. entitled "Programmable remapper for image processing" describes an image processing system for realising image pre-processing for maculopathy. It is also suggested that the pre-processor described in this patent could also be useful for optical correlators. However, the different functions described are the usual log-polar, ring-wedge, log-log mathematical operations. The problem with these functions is that they give rise to the problem of image centering. Because these techniques give different object representations for different centers of expansion, the object has to be centered conveniently before the recognition can be properly effected.

Most of the other known techniques are derived from the field of pattern recognition where an object has to be recognised with invariance to scale, rotation and size. One of these techniques is based on the expansion of the object in mathematical components (see, for example, Y. N. Hsu and H. H. Arsenault, "Pattern Discrimination by Multiple Circular Harmonic Components", Appl. Opt., 23, 841, (1984)). Other techniques are based on geometrical or mathematical transformation of an object, such as the techniques described in Y. Sheng, C. Lejeune, H. H. Arsenault, "Frequency-domain Fourier-Mellin descriptors for invariant pattern recognition", Optical Engineering, 27, 5, 354, (1988), and D. Casasent, S-F X., A. J. Lee, J.-Z Song, "Real-time deformation invariant optical pattern recognition using coordinate transformations", Applied Optics, 26, 5, 1987.

Invariant moments are also used for these kinds of operations, and in this case, the moments of inertia are computed according to a center of expansion. This technique is described in Q. Zhan, T. Minemoto, "Moment invariants for pattern recognition under translation, rotation, and changes of size and brightness", Journal of Modern optics, 40, 11, 2267, 1993.

These methods suffer from different problems that can be itemized as follows:

The gain of an invariance, for instance rotation, will be accompanied by a loss of the robustness for another invariance, for example scale robustness;

The gain of an invariance is often accompanied by a loss of information on the object;

The information on the rotation angle or scale factor is lost with the adjunction of invariance, so one is able to locate an object but is not easily able to identify its rotation angle or scale factor;

The evaluation of the angle of rotation or scale factor thus requires display of multiple filters, increasing the processing time. As such, the time required to evaluate 1024 rotation angle or scale factors is 1024 times greater than the one required for one rotation angle and one scale factor.

Most of these methods rely on finding an appropriate center of expansion of an object, which itself requires considerable computations; and When a technique requires a center of expansion, it is then intrinsically not able to operate in the presence of multiple objects in the input plane.

SUMMARY OF THE INVENTION

It is an object of the invention to provide a method and apparatus for performing scale factor and rotation evaluation in an image processing system, which reduces the amount of computations required to obtain useful results. Also, the invention is concerned with a method and apparatus which does not require object centering prior to performing the analysis, and which does not require complex mathematical expansion of the object under analysis. Other objects will become apparent hereinafter.

In accordance with the invention, this object is achieved with:

a method for evaluating a scale factor and a rotation angle in image processing, comprising the steps of:
(a) providing an input image;
(b) reducing the input image to provide a smaller image;
(c) scaling the smaller image according to a plurality of factors to produce a plurality of scaled images;
(d) rotating the smaller image according to a plurality of factors to produce a plurality of rotated images;
(e) placing the scaled images and the rotated images into a mosaic arranged by scale and rotation;
(f) providing a reference template;
(g) correlating said reference template with said mosaic of scaled and rotated images; and
(h) providing a scale factor and a rotation angle based on the position in the mosaic of the highest correlation value between the reference template and the scaled and rotated images;

a method for evaluating a scale factor and a rotation angle in image processing, comprising the steps of:
(a) providing an input image;
(b) reducing the input image to provide a smaller image;
(c) providing a reference template;
(d) scaling the reference template according to a plurality of factors to produce a plurality of scaled images;
(e) rotating the reference template according to a plurality of factors to produce a plurality of rotated images;
(f) placing the scaled images and the rotated images into a mosaic arranged by scale and rotation;

(g) correlating said smaller image with said mosaic of scaled and rotated images; and (h) providing a scale factor and a rotation angle based on the position in the mosaic of the highest correlation value between the smaller image and the scaled and rotated images.

Another aspect of the invention concerns a system for evaluating a scale factor and a rotation angle in image processing, comprising:

(a) input means for receiving an input image;

(b) means for reducing the input image to provide a smaller image;

(c) means for scaling the smaller image according to a plurality of factors to produce a plurality of scaled images;

(d) means for rotating the smaller image according to a plurality of factors to produce a plurality of rotated images;

(e) means for receiving and placing the scaled images and the rotated images into a mosaic arranged by scale and rotation;

(f) means for providing at least one reference template;

(g) means for correlating each of said at least one reference template with said mosaic of scaled and rotated images; and (h) means for providing a scale factor and a rotation angle based on the position in the mosaic of the highest correlation value between each of the reference templates and the scaled and rotated images;

Alternatively, the present invention concerns a system for evaluating a scale factor and a rotation angle in image processing, comprising:

(a) input means for receiving an input image;

(b) means for reducing the input image to provide a smaller image;

(c) means for providing at least one reference template;

(d) means for scaling each of the at least one reference template according to a plurality of factors to produce a plurality of scaled images;

(e) means for rotating each of the at least one reference template according to a plurality of factors to produce a plurality of rotated images;

(f) means for placing the scaled images and the rotated images into a mosaic arranged by scale and rotation for each of the reference template;

(g) means for correlating said smaller image with each of said mosaic of scaled and rotated images; and (h) means for providing a scale factor and a rotation angle based on the position in the mosaic of the highest correlation value between the smaller image and the scaled and rotated images;

Finally, a method for evaluating a scale factor and a rotation angle in image processing is described, comprising the steps of:

(a) providing an input image;

(b) scaling the image according to a plurality of factors to produce a plurality of scaled images;

(c) rotating the image according to a plurality of factors to produce a plurality of rotated images;

(d) placing the scaled images and the rotated images into a mosaic arranged by scale and rotation;

(e) providing a reference template;

(f) correlating said reference template with said mosaic of scaled and rotated images; and (g) providing a scale factor and a rotation angle based on the position in the mosaic of the highest correlation value between the reference template and the scaled and rotated images.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

Figure 1A:
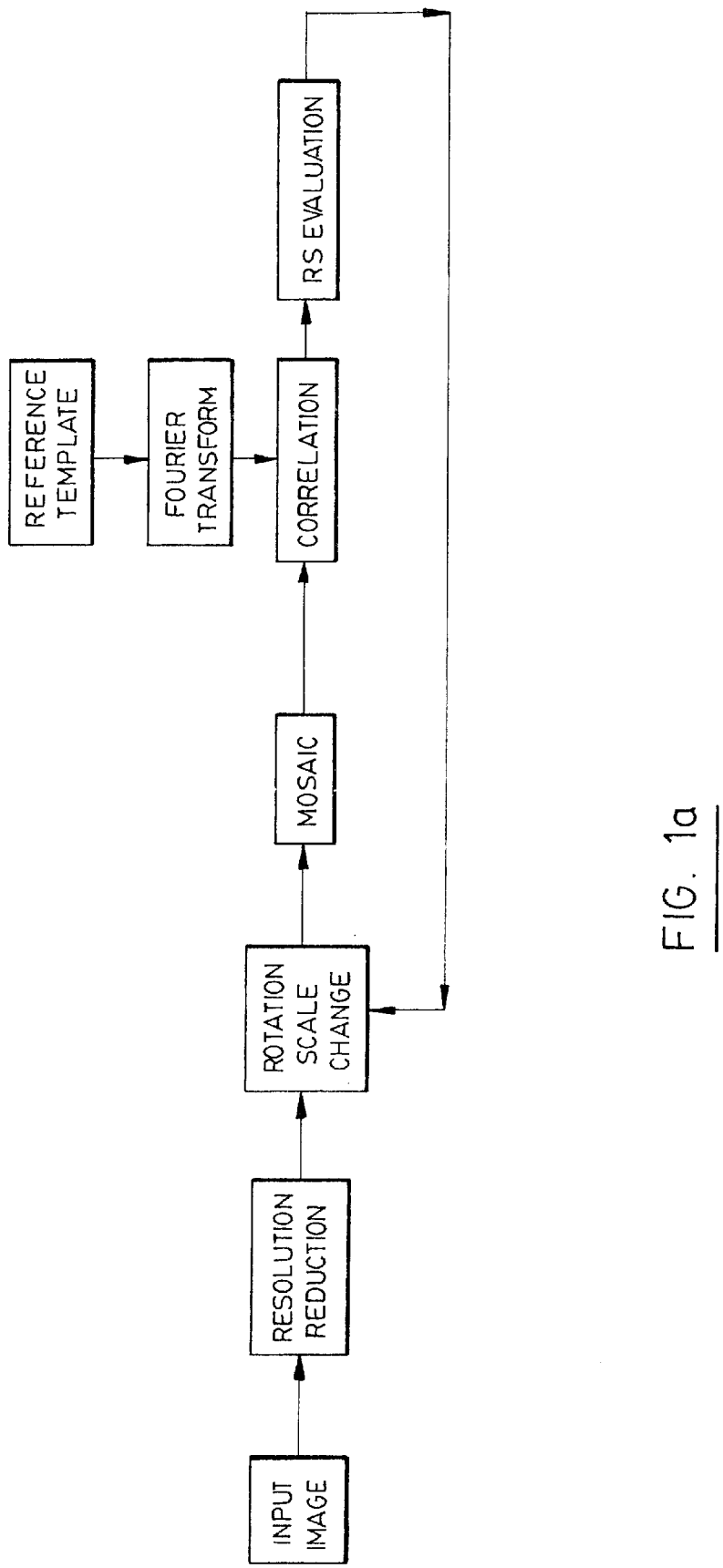
FIGS. 1a, 1b and 1c are schematic representations of the steps of the method according to a preferred embodiment of the invention, of a pictorial representation of the application of the method for an unscaled and not rotated object, and of a pictorial representation of the application of the method for a scaled and rotated object.

The present invention finds application in the field of image processing, and more precisely in pattern recognition and target tracking. The invention can be useful in applications requiring rotation angle evaluation, scale evaluation, or distance evaluation. It can also be useful in pattern recognition applications implying a change of rotation, scale or distance of the object targeted (or of the camera used to observe the scene).

The invention is a processing technique for the evaluation of the angle of rotation of an object, the scale of an object or the distance of an object. Given an image of an object, it will give the rotation angle, and the scale or the distance of the object according to a reference template. This information can then be further used to remap and recognize an object.

Another field in which the invention may be useful is in the evaluation of the out of plane rotation of a three dimensional object observed with a camera. It is often required to know the angle of rotation of the object both according to the plane perpendicular to the camera and to the plane parallel to the camera.

The technique developed for the rotation angle (in-plane and out of plane), and the scale evaluation (either isomorphic or anamorphic) and/or the distance evaluation (which is equivalent to scale evaluation) will be referred herein as "RS evaluation" technique. The RS technique is achieved using reduction of the resolution of the image grabbed, followed with a mapping of the information to different scales and rotations and completed finally by a correlation with a reference template.

The method includes the following basic steps. First, an unknown input image is reduced in resolution to provide a smaller image. The smaller the image, the larger the number of scale factor and rotation angle that can be evaluated. If the object is already small enough to accommodate multiple replica in the same image then the reduction step can be eliminated. For example, the resolution reduction can be either performed by sampling, mean, or other algorithms. The smaller image is then scaled and rotated according to different values. This step can easily be performed with the help of a look-up-table with corresponding positions. Look-up-table mapping can be performed with simple memory addressing operations and is not a time-consuming operation.

Using standard co-ordinate transformation implies multiple computations. However, the relationship between a rotated and scaled image can be pre-computed. When computing the scale and rotation change, if the correspondence between the original image pixels position and the rotated-scaled image pixels position is pre-computed, then the rotation-scale change can be applied simply by changing position of the original image pixels. It should be understood that the look-up table is applied to the position of the pixels rather than to the value of the pixels.

The look-up-table can also accommodate for out-of-plane rotations. For instance, if an object with almost planar front surface (the surface directed toward the camera) is rotated around the axis parallel to its surface, then the change of aspect perceived by the camera can be expressed by simple anamorphic scale change, i.e. the object will have the same height, but will appear thinner. Moreover, if the surface is mostly planar or the general three dimensional model of the object is available, an out-of-plane rotation can be approximated by simple look-up-table corresponding to position changes.

A large image (mosaic) containing all the replicas of the input images (rotated and scaled) is then generated. The range of angle and scale evaluation depends on the number of small images than can be tiled in the mosaic. This is dependant on both the size of the small replicas and the size of the image containing the whole mosaic. Once the mosaic is generated, the whole image is compared by correlation means to a reference template.

The reference template is used to generate a filter via a Fourier transform operation. The reference template can be pre-computed. Usually the small replica of the reference with a 1.0 scale factor and no rotation is used to perform the correlation. The correlation can be either performed digitally or optically, using known means.

The correlation plane will provide a mosaic of correlations. The correlation plane is divided into sub-sections each corresponding to a scale factor and a rotation angle. By evaluating the maximum correlation value, an evaluation of the scale factor and the rotation angle (according to the reference template) is performed. It is to be noted that if the image is scaled by a factor of 90% the stronger correlation will be observed at 1.0/0.90. Similarly, if the image is rotated by 10 degrees, the maximum correlation will appear at −10 degrees.

Figure 1B:
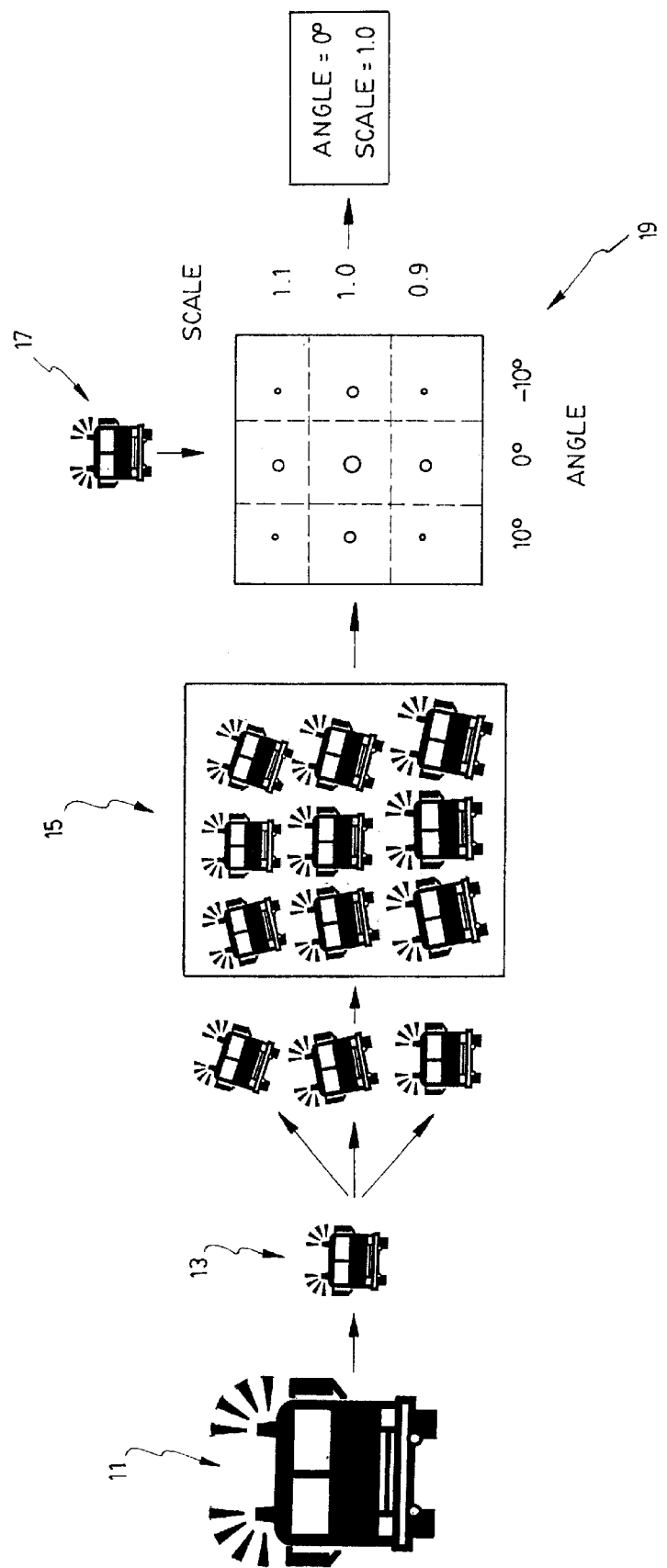
Figure 1C:
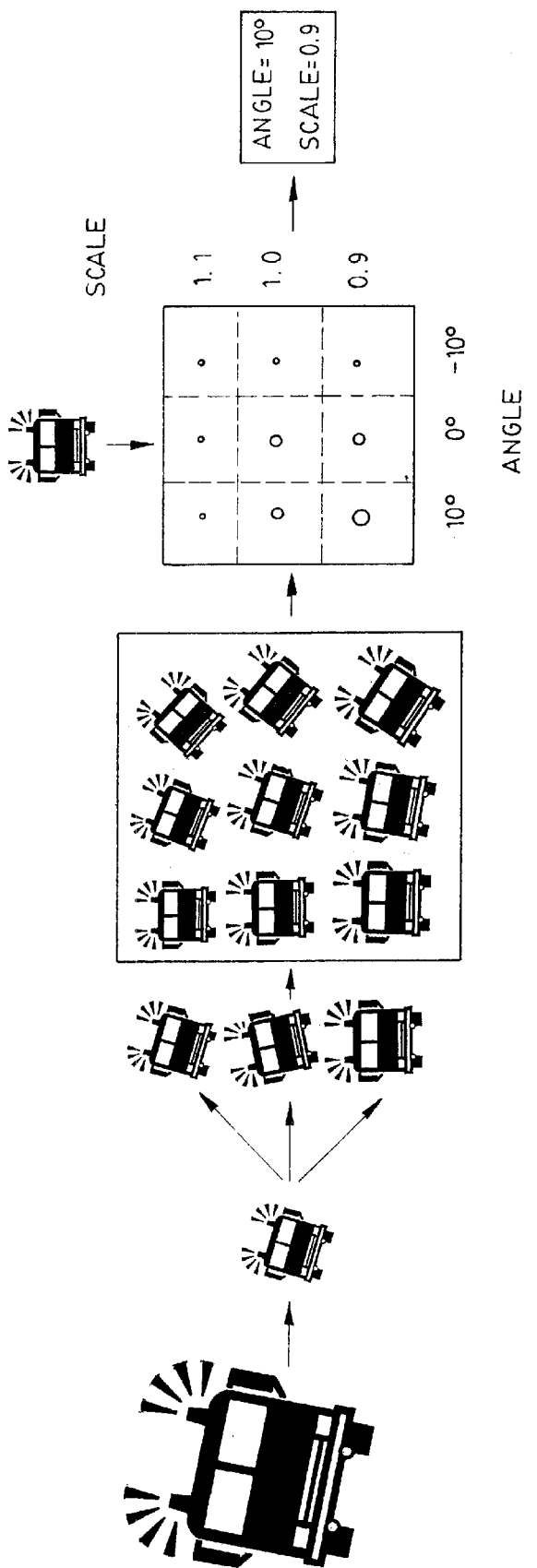

Referring now to FIG. 1a, there is shown the steps of the method. FIG. 1b pictorially shows the application of the method. The input image 11 is reduced to produce a reduced image 13. The reduced image is rotated and scaled according to different factors and arranged in a mosaic 15. In this case, the top row of the mosaic represents the reduced image scaled to detect 1.1 times and rotated to detect 10, 0 and −10 degrees, respectively. The middle row and the bottom row are equivalent, but for scale factors of 1.0 and 0.9 of the reduced image. A reference template 17, is used to generate a filter through a Fourier Transform operation. The reference template 17 is correlated with the mosaic 15. This operation produces a mosaic of correlations, and by identifying the highest correlation, information about the rotation angle and scale of the object is provided. FIG. 1b produces a result where the rotation angle is 0 degrees, and the scale factor 1.0. However, FIG. 1c produces a result where the rotation angle is 10 degrees, and the scale factor 0.9.

Figure 2A:
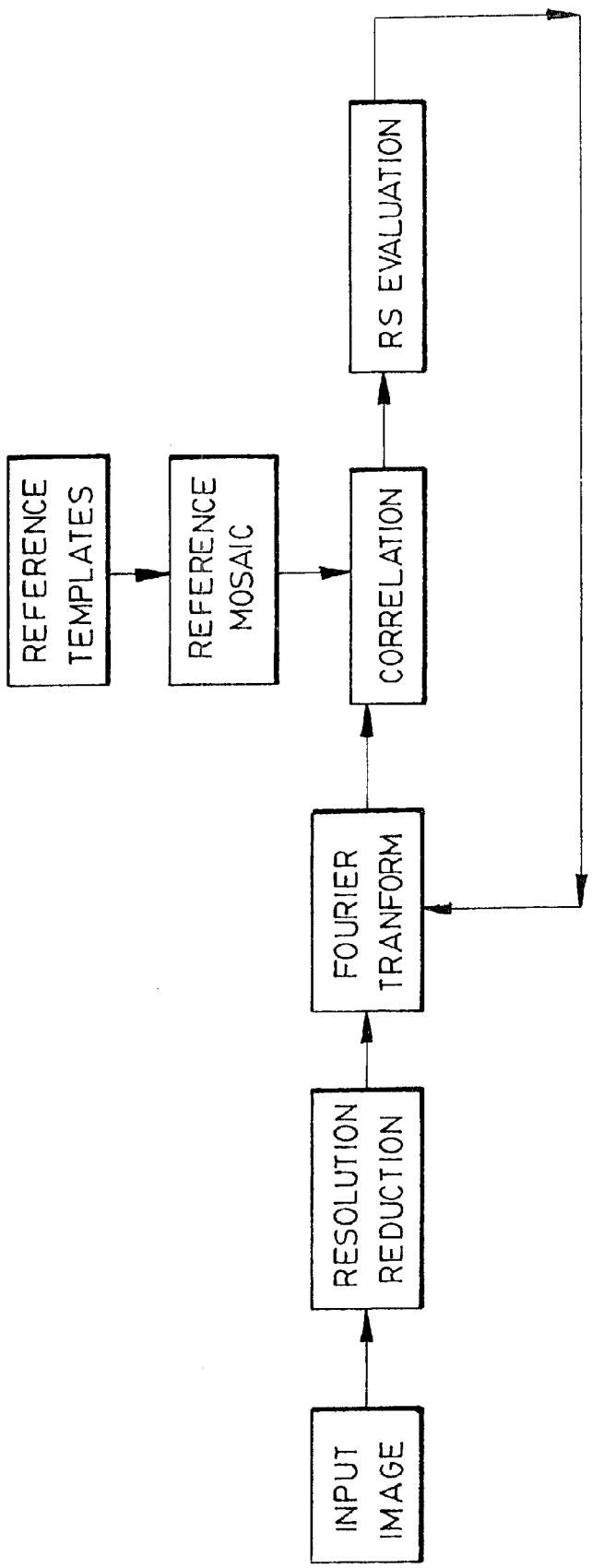
FIGS. 2a and 2b are schematic representations of the steps of the method according to a variation thereof, and of a pictorial representation of the application of the method according to this variation.
Figure 2B:
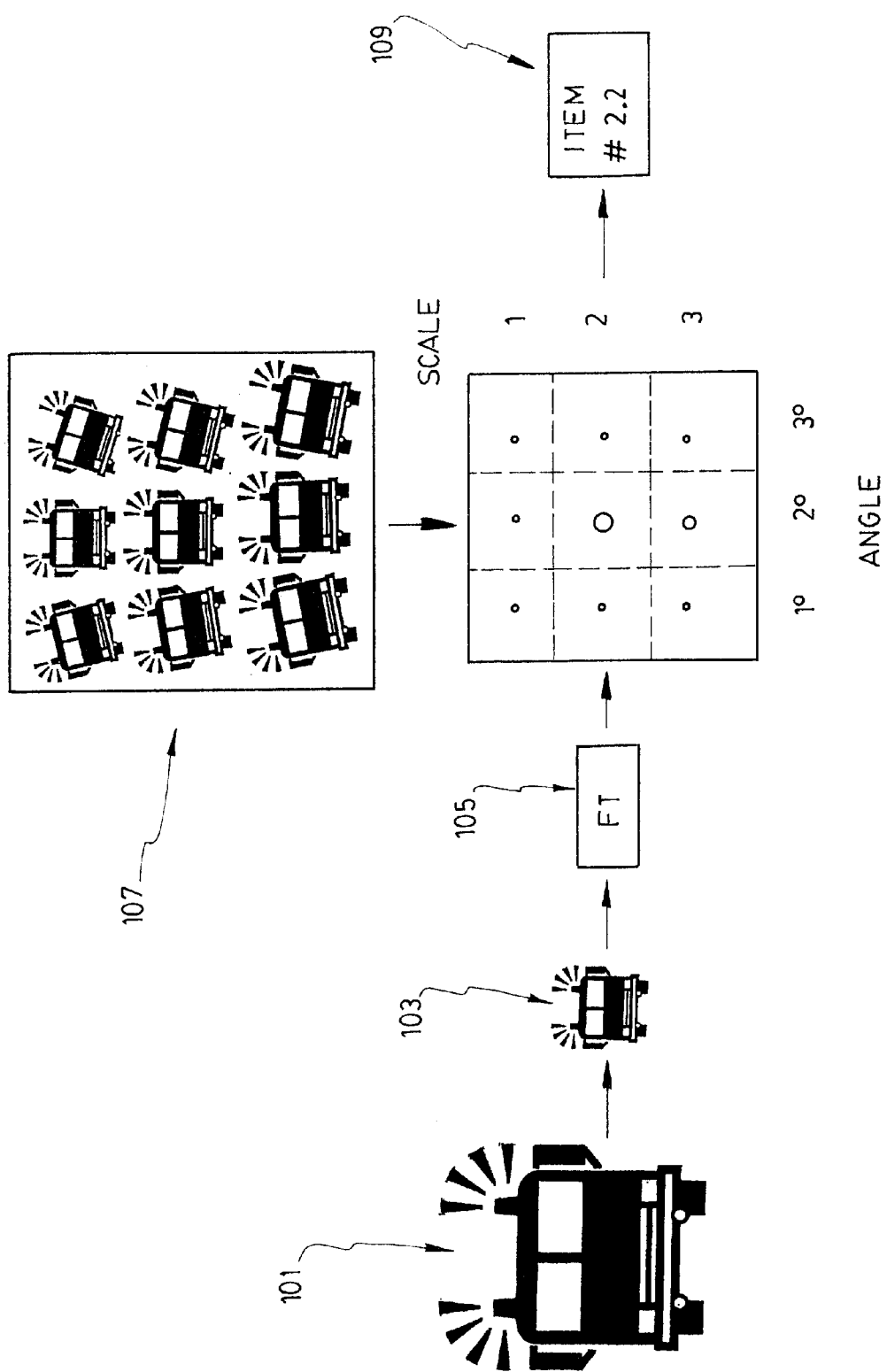

A slight modification of the technique, illustrated in FIG. 2, can also be used to roughly evaluate the parameters mentioned above. In this case, the object acquired (input image) 101 is reduced in dimensions 103 and a filter is generated from the Fourier transform of the object 105. Because the object is reduced in dimension, the Fourier transform will be less time consuming than the Fourier transform on larger images.

A mosaic of images in the database 107, created either from the different scales of an object, the different rotations or the different aspects (for instance from different three dimension points of view) is presented as the input image. From the one step correlation, the most corresponding pattern can be identified 109, and consequently the rotation angle, the scale, the types or the aspect of the object are known. Further processing can thus be realized to confirm or refine the answer.

Once the rotation, the scale, or the aspect of the object have been evaluated by any of the two previous techniques, the original object can be rescaled, rotated or remapped and then compared at high resolution with correlation means for final identification.

The present invention thus concerns a rotation or scale evaluation technique comprising, as main steps, the reduction of the resolution of a scene, the creation of a mosaic of small images rotated, scaled, or projected; the correlation of the images with a reduced pattern; and the identification of the rotation or scale according to the results. The rotation of the objects can be inplane or out-of-plane, and the scale change can be either isomorphic or anamorphic. The mosaic can include objects of different aspects and where the images of the objects can come from different points of view.

The method according to the present invention can be either performed numerically or optically, in its entirety or partially.

The RS technique according to the present invention is based on the creation of a mosaic in the input plane, avoiding the reduction of diffraction efficiency and allowing the use of fast and simple look-up-table operation for RS evaluation. There is thus no need for log-polar or log-log conversions to achieve rotation and scale invariance, nor any need for object centering. As such, the translation invariance of the correlation operation is not lost due to change of the object aspect with a change of the center of representation.

The overall technique is rotation, scale and translation invariant, and the information on scale factor, rotation angle and position is conserved.

The use of a single correlation gives the evaluation of the rotation angles and scale factors over a wide range reducing the overall processing time.

There is no need for complex mathematical expansion of the objects and multiple correlations are performed within a single frame.

The resolution reduction should be high enough for the evaluation of multiple scale factor or rotation angle. However it should be small enough to preclude loss of critical information of the object. For instance, an object of 256×256 pixels with a 2 times reduction factor gives evaluation of 4 parameters with small images of 128×128 pixels. Given a 32 times reduction factor, a mosaic of 32×32 objects, each showing 8×8 pixels, can be generated, giving an evaluation of 1024 parameters (scale, rotation or else). However, a reduction factor of 64 would reduce the smaller images to 4×4 which would not be sufficient enough for most parameter evaluations. The resolution factor as such should be chosen to conserve enough information to evaluate the required parameter.

The correlation can either be performed on numerical platform or optical correlator.

It should be understood that the method and system of the present invention can also be easily modified to accommodate any number of reference templates, for example in the case where the image processing system is adapted to perform recognition of various objects, by repeating the steps of the method for each different reference template. Recognition will be presumed with a predetermined level of certainty when the correlation value is above a threshold level.

Finally, the method and system of the present invention are preferably embodied in a computer program.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A method for evaluating a scale factor and a rotation angle in image processing, comprising the steps of:
    (a) providing an input image;
    (b) reducing the input image to provide a smaller image;
    (c) scaling the smaller image according to a plurality of factors to produce a plurality of scaled images;
    (d) rotating the smaller image according to a plurality of factors to produce a plurality of rotated images;
    (e) placing the scaled images and the rotated images into a mosaic arranged by scale and rotation;
    (f) providing a reference template;
    (g) correlating said reference template with said mosaic of scaled and rotated images; and
    (h) providing a scale factor and a rotation angle based on the position in the mosaic of the highest correlation value between the reference template and the scaled and rotated images.

2. A method according to claim 1, wherein said method further includes step (f.1) performing a Fourier transform on said reference template.

3. A method according to claim 1, wherein said step (c) of scaling the reduced images comprises an isomorphic scale change.

4. A method according to claim 1, wherein said step (c) of scaling the reduced image comprises an anamorphic scale change.

5. A method according to claim 1, wherein said rotation is an in-plane rotation.

6. A method according to claim 1, wherein said rotation is an out-of-plane rotation.

7. A method according to claim 1, further comprising the steps of:
    (i) remapping the input image to its input size; and
    (j) comparing the remapped image to a reference template at a higher resolution for recognising the input image.

8. A method according to claim 1, wherein said step (j) includes correlating the remapped image to a reference template.

9. A method for evaluating a scale factor and a rotation angle in image processing, comprising the steps of:
    (a) providing an input image;
    (b) reducing the input image to provide a smaller image;
    (c) providing a reference template;
    (d) scaling the reference template according to a plurality of factors to produce a plurality of scaled images;
    (e) rotating the reference template according to a plurality of factors to produce a plurality of rotated images;
    (f) placing the scaled images and the rotated images into a mosaic arranged by scale and rotation;
    (g) correlating said smaller image with said mosaic of scaled and rotated images; and
    (h) providing a scale factor and a rotation angle based on the position in the mosaic of the highest correlation value between the smaller image and the scaled and rotated images.

10. A method according to claim 9, wherein said method further includes step (b.1) performing a Fourier transform on said smaller image.

11. A method according to claim 9, wherein said step (d) of scaling the reference template comprises an isomorphic scale change.

12. A method according to claim 9, wherein said step (d) of scaling the reference template comprises an anamorphic scale change.

13. A method according to claim 9, wherein said rotation is an in-plane rotation.

14. A method according to claim 9, wherein said rotation is an out-of-plane rotation.

15. A method according to claim 9, further comprising the steps of:
    (i) remapping the input image to its input size; and
    (j) comparing the remapped image to a reference template at a higher resolution for recognising the input image.

16. A method according to claim 1, wherein said step (j) includes correlating the remapped image to a reference template.

17. A system for evaluating a scale factor and a rotation angle in image processing, comprising:
    (a) input means for receiving an input image;
    (b) means for reducing the input image to provide a smaller image;
    (c) means for scaling the smaller image according to a plurality of factors to produce a plurality of scaled images;
    (d) means for rotating the smaller image according to a plurality of factors to produce a plurality of rotated images;
    (e) means for receiving and placing the scaled images and the rotated images into a mosaic arranged by scale and rotation;
    (f) means for providing at least one reference template;
    (g) means for correlating each of said at least one reference template with said mosaic of scaled and rotated images; and
    (h) means for providing a scale factor and a rotation angle based on the position in the mosaic of the highest correlation value between each of the reference templates and the scaled and rotated images.

18. A system for evaluating a scale factor and a rotation angle in image processing, comprising:
    (a) input means for receiving an input image;
    (b) means for reducing the input image to provide a smaller image;
    (c) means for providing at least one reference template;
    (d) means for scaling each of the at least one reference template according to a plurality of factors to produce a plurality of scaled images;
    (e) means for rotating each of the at least one reference template according to a plurality of factors to produce a plurality of rotated images;
    (f) means for placing the scaled images and the rotated images into a mosaic arranged by scale and rotation for each of the reference template;
    (g) means for correlating said smaller image with each of said mosaic of scaled and rotated images; and (h) means for providing a scale factor and a rotation angle based on the position in the mosaic of the highest correlation value between the smaller image and the scaled and rotated images.

19. A method for evaluating a scale factor and a rotation angle in image processing, comprising the steps of:

(a) providing an input image;

(b) scaling the image according to a plurality of factors to produce a plurality of scaled images;

(c) rotating the image according to a plurality of factors to produce a plurality of rotated images;

(d) placing the scaled images and the rotated images into a mosaic arranged by scale and rotation;

(e) providing a reference template;

(f) correlating said reference template with said mosaic of scaled and rotated images; and (g) providing a scale factor and a rotation angle based on the position in the mosaic of the highest correlation value between the reference template and the scaled and rotated images.

* * * * *